(12) United States Patent
Huang et al.

(10) Patent No.: US 10,625,447 B2
(45) Date of Patent: *Apr. 21, 2020

(54) MOLDING DEVICE HAVING HEATING FUNCTION

(71) Applicant: POU CHEN CORPORATION, Chang Hwa Hsien (TW)

(72) Inventors: Hsiang-Yu Huang, Taichung (TW); Shih-Chia Lin, Yuanlin (TW); Hung-Wu Hsieh, Xizhou Township (TW); Ju-Cheng Chen, Tainan (TW); Tsung-Wei Kuo, Changhua (TW)

(73) Assignee: Pou Chen Corporation, Chang Hwa Hsien (TW)

( * ) Notice: Subject to any disclaimer, the term of this patent is extended or adjusted under 35 U.S.C. 154(b) by 37 days.

This patent is subject to a terminal disclaimer.

(21) Appl. No.: 15/968,529

(22) Filed: May 1, 2018

(65) Prior Publication Data

US 2018/0319049 A1    Nov. 8, 2018

(30) Foreign Application Priority Data

May 3, 2017 (TW) .............................. 106114628 A

(51) Int. Cl.
*B29C 43/52* (2006.01)
*B29C 43/36* (2006.01)
(Continued)

(52) U.S. Cl.
CPC ............ *B29C 43/52* (2013.01); *A43B 13/187* (2013.01); *B29C 33/06* (2013.01); *B29C 43/02* (2013.01);
(Continued)

(58) Field of Classification Search
CPC .......... B29C 43/52; B29C 43/58; B29C 44/58
(Continued)

(56) References Cited

U.S. PATENT DOCUMENTS 2,317,597 A * 4/1943 Ford ....................... B29C 33/04
425/407
5,394,603 A * 3/1995 Reil ....................... B29B 13/023
29/463
(Continued)

FOREIGN PATENT DOCUMENTS

CN 205835798 U * 12/2016
CN 205835798 U   12/2016
(Continued)

OTHER PUBLICATIONS

Machine Translation CN106393549 (Year: 2017).*
(Continued)

*Primary Examiner* — Matthew J Daniels
*Assistant Examiner* — Wayne K. Swier
(74) *Attorney, Agent, or Firm* — Michael Best & Friedrich LLP

(57) ABSTRACT

A molding device includes a lower mold seat including a lower mounting portion, a lower die core assembly mounted in the lower mounting portion and including a lower die core unit defining a mold cavity, an upper mold seat including an upper mounting portion, an upper die core assembly mounted in the upper mounting portion and including an upper die core unit covering the mold cavity, and upper and lower heating units respectively including upper and lower high-frequency heating members respectively inducing eddy current in at least one of the lower die core unit and the lower mold seat and at least one of the upper die core unit and the upper mold seat.

11 Claims, 8 Drawing Sheets

(51) Int. Cl.
  *B29C 43/02* (2006.01)
  *B29C 33/06* (2006.01)
  *B29D 35/12* (2010.01)
  *B29D 35/00* (2010.01)
  *B33Y 80/00* (2015.01)
  *A43B 13/18* (2006.01)
  *B29L 31/50* (2006.01)
  *B29K 23/00* (2006.01)
  *B29K 75/00* (2006.01)
  *B29C 35/08* (2006.01)
  *B29K 105/04* (2006.01)
  *B29C 44/58* (2006.01)
  *B29C 44/34* (2006.01)

(52) U.S. Cl.
  CPC .......... *B29C 43/36* (2013.01); *B29D 35/0063* (2013.01); *B29D 35/122* (2013.01); *B29D 35/128* (2013.01); *B33Y 80/00* (2014.12); *B29C 44/3415* (2013.01); *B29C 44/58* (2013.01); *B29C 2035/0811* (2013.01); *B29C 2035/0816* (2013.01); *B29K 2023/083* (2013.01); *B29K 2075/00* (2013.01); *B29K 2105/04* (2013.01); *B29K 2905/12* (2013.01); *B29L 2031/504* (2013.01)

(58) Field of Classification Search
  USPC .......................................... 425/144
  See application file for complete search history.

(56) References Cited

U.S. PATENT DOCUMENTS

| | | | | |
|---|---|---|---|---|
| 5,441,675 A | * | 8/1995 | Souders | ................ B29C 33/046 264/402 |
| 5,793,024 A | * | 8/1998 | Matsen | ............. B29C 66/81261 219/633 |
| 8,657,595 B2 | * | 2/2014 | Feigenblum | ............ B29C 33/06 425/174.8 R |
| 2004/0041303 A1 | * | 3/2004 | Kim | ........................ B29C 33/02 264/320 |
| 2004/0212110 A1 | * | 10/2004 | Fujimoto | ................ B29C 33/02 264/1.32 |
| 2014/0000044 A1 | | 1/2014 | Boardman et al. | |
| 2017/0165493 A1 | * | 6/2017 | Bortolin | ............... A61N 1/3752 |

FOREIGN PATENT DOCUMENTS

| | | | |
|---|---|---|---|
| CN | 106393549 A | * | 2/2017 |
| CN | 106393549 A | | 2/2017 |
| CN | 206106200 U | * | 4/2017 |
| CN | 206106200 U | | 4/2017 |
| TW | M428951 U1 | | 5/2012 |
| TW | M539824 U | | 4/2017 |
| WO | 9943482 A1 | | 9/1999 |

OTHER PUBLICATIONS

Machine Translation CN205835798 (Year: 2016).*
Machine Translation CN206106200 (Year: 2017).*
Search Report appended to an Office Action issued to Taiwanese counterpart application No. 106114628 by the TIPO dated May 11, 2018.
Search Report appended to an Office Action issued to Taiwanese counterpart application No. 106114628 by the TIPO dated Dec. 26, 2018 (2 pages, English translation included).
Search Report appended to an Office Action, which was issued to Chinese counterpart application No. 201710305288.7 by the CNIPA dated Nov. 26, 2019, with an English translation thereof.

* cited by examiner

MOLDING DEVICE HAVING HEATING FUNCTION

CROSS-REFERENCE TO RELATED APPLICATION

This application claims priority of Taiwanese Invention Patent Application No. 106114628, filed on May 3, 2017.

FIELD

The disclosure relates to a molding device, and more particularly to a molding device having heating function for heating and molding a raw material into a shoe sole.

BACKGROUND

Ethylene-vinyl acetate (EVA) foam material or thermoplastic polyurethane (TPU) foam material are widely used in making insole or outsole of shoes because of their superior cushion, shock-absorbing, heat insulation, moistureproof, chemical resistant properties. EVA and TPU are also non-toxic and non-water absorbing, which is quite environment friendly.

Referring to FIG. 1, a molding device 1 disclosed by Taiwanese Invention Patent No. 576329 includes a heating mold assembly 11 and a cooling mold assembly 12. The heating mold assembly 11 includes a lower mold 111, and an upper mold 113 that is removably connected to the lower mold 111 to cooperate with the lower mold 111 to define a mold cavity 112 therebetween. The heating mold assembly 11 further includes a plurality of heating members 114, such as resistive heater, that are disposed in the lower and upper molds 111, 113. When the heating members 114 are heated up, the lower and upper molds 111, 113 will also be heated up via thermal conduction to heat up a molding material received in the mold cavity 112.

The heating and subsequent cooling efficiency of the lower and upper molds 111, 113 will affect heating uniformity and heating cycle time of the molding material, and therefore the quality of a final product. While the resistive heating members 114 have a rather quick heating capability, which may be around 1 to 3° C. per second, it is quite difficult to precisely control the resistive heating members 114 to a desirable range, thereby resulting in difficulties in the temperature control of the lower and upper molds 111, 113, which might reduce the service life of the lower and upper molds 111, 113.

SUMMARY

Therefore, an object of the disclosure is to provide a molding device that can alleviate the drawback of the prior art.

According to an aspect of the present disclosure, a molding device is adapted to heat and mold a raw material. The molding device includes a lower mold seat, a lower die core assembly, an upper mold seat, an upper die core assembly, a lower heating unit and an upper heating unit.

The lower mold seat includes a lower mounting portion. The lower die core assembly is mounted to the lower mounting portion of the lower mold seat, and includes a lower die core unit that defines a mold cavity. The upper mold seat includes an upper mounting portion. The upper die core assembly is mounted to the upper mounting portion of the upper mold seat, and includes an upper die core unit that covers the mold cavity. The lower heating unit includes a lower high-frequency heating member that is mounted to the lower mounting portion of the lower mold seat and that induces eddy current in at least one of the lower die core unit and the lower mold seat to heat up the at least one of the lower die core unit and the lower mold seat. The upper heating unit includes an upper high-frequency heating member that is mounted to the upper mounting portion of the upper mold seat and that induces eddy current in at least one of the upper die core unit and the upper mold seat to heat up the at least one of the upper die core unit and the upper mold seat.

BRIEF DESCRIPTION OF THE DRAWINGS

Other features and advantages of the disclosure will become apparent in the following detailed description of the embodiment and variation with reference to the accompanying drawings, of which.

DETAILED DESCRIPTION

Figure 1:
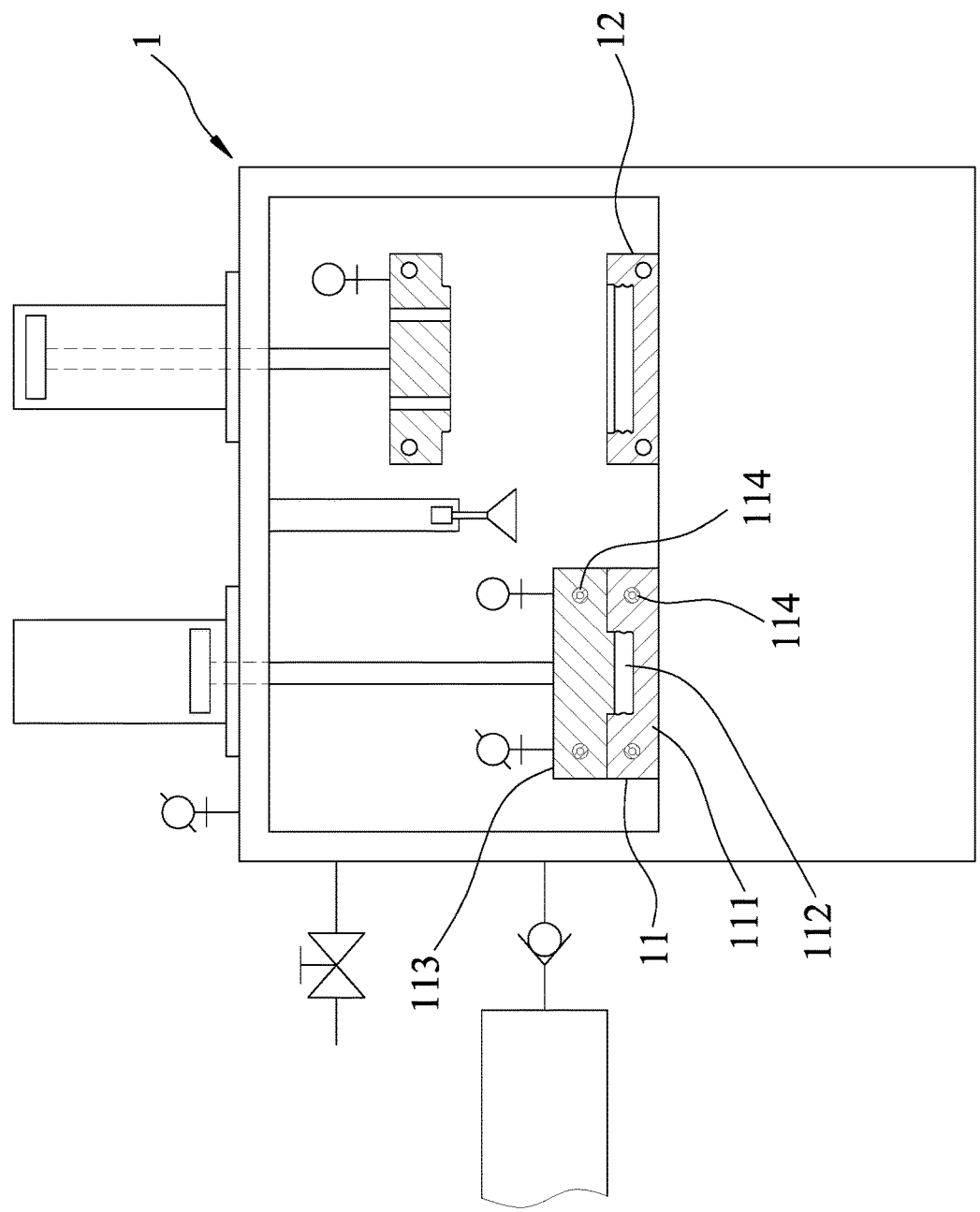
FIG. 1 is a schematic view of a molding device according to Taiwanese Invention Patent No. 576329.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
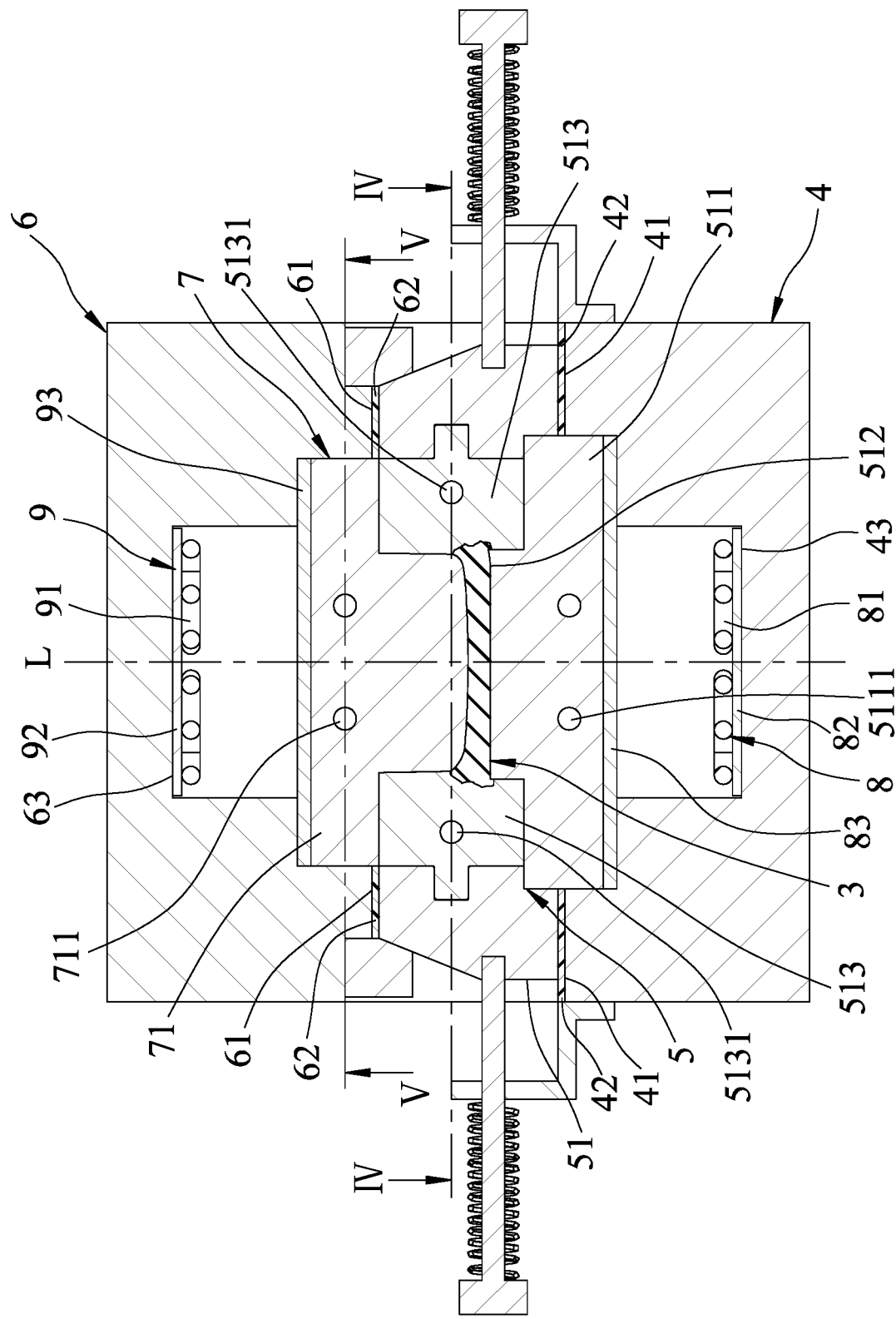
FIG. 2 is a sectional view of an embodiment of a molding device according to the present disclosure.
Figure 3:
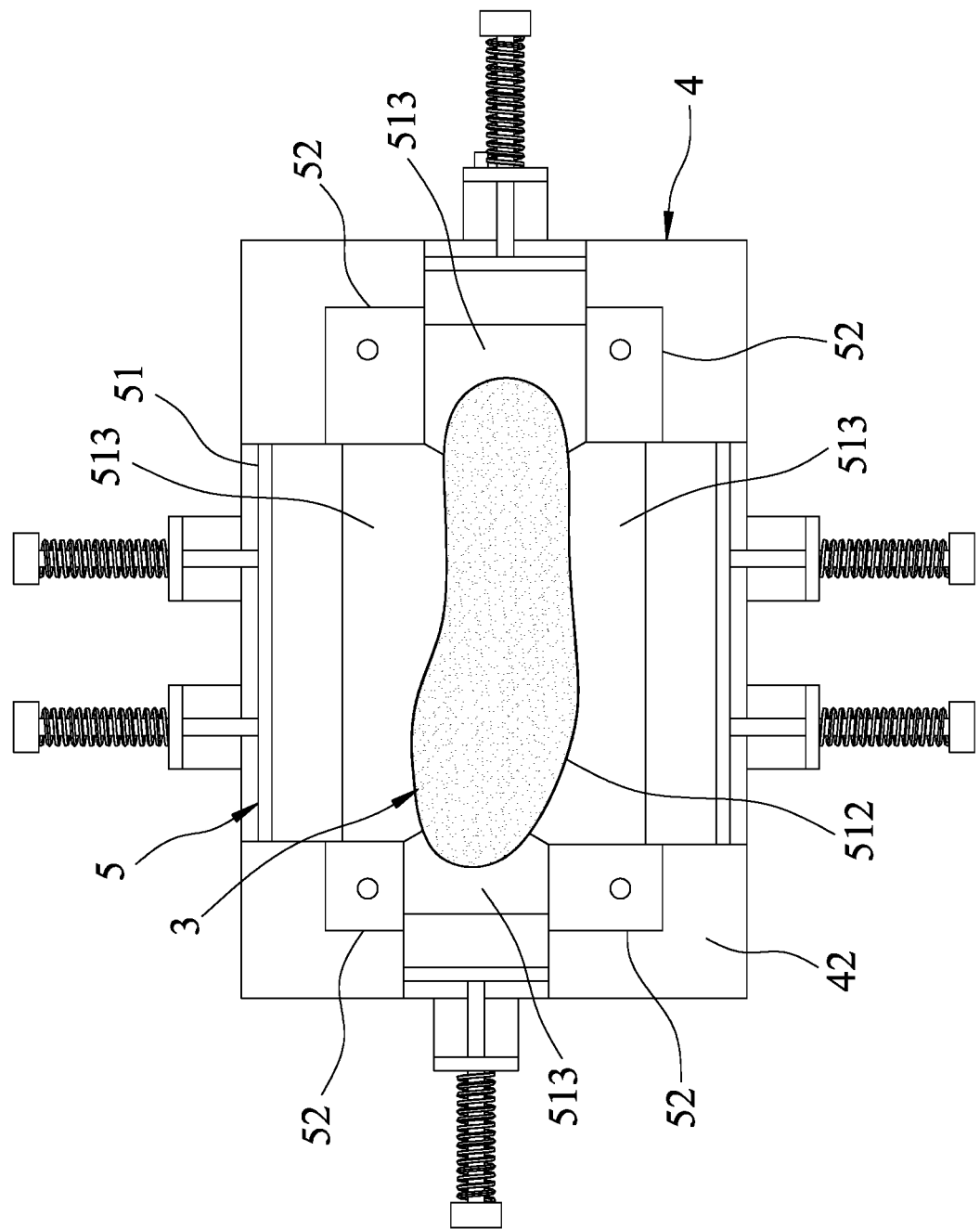
FIG. 3 is a top view of a lower mold seat and a lower die core assembly of the embodiment, showing the lower die core assembly in a closed state.

Referring to FIGS. 2 and 3, an embodiment of a molding device according to the present disclosure is adapted to heat and mold a raw material (e.g., a foaming material 3) into a shoe sole. The molding device includes a lower mold seat 4, a lower die core assembly 5, an upper mold seat 6, an upper die core assembly 7, a lower heating unit 8 and an upper heating unit 9.

The lower mold seat 4 is made of steel, and includes a lower mounting portion 43 that is downwardly concaved along a central axis (L), an upward facing surface 41 that faces the upper mold seat 6 and a lower insulating layer 42 that is formed on the upward facing surface 41.

Figure 4:
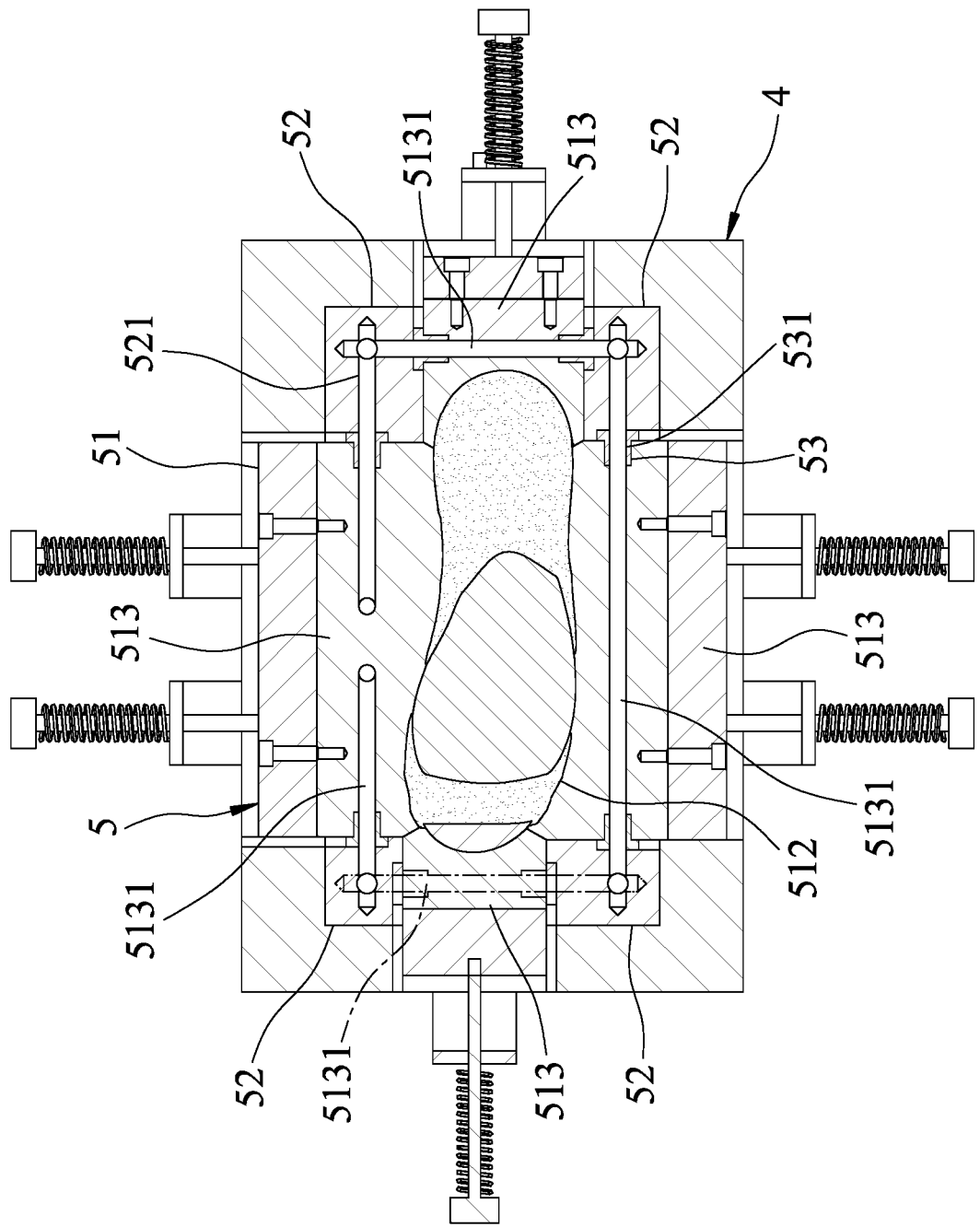
FIG. 4 is a sectional view of the embodiment taken along line IV-IV of FIG. 2.
Figure 5:
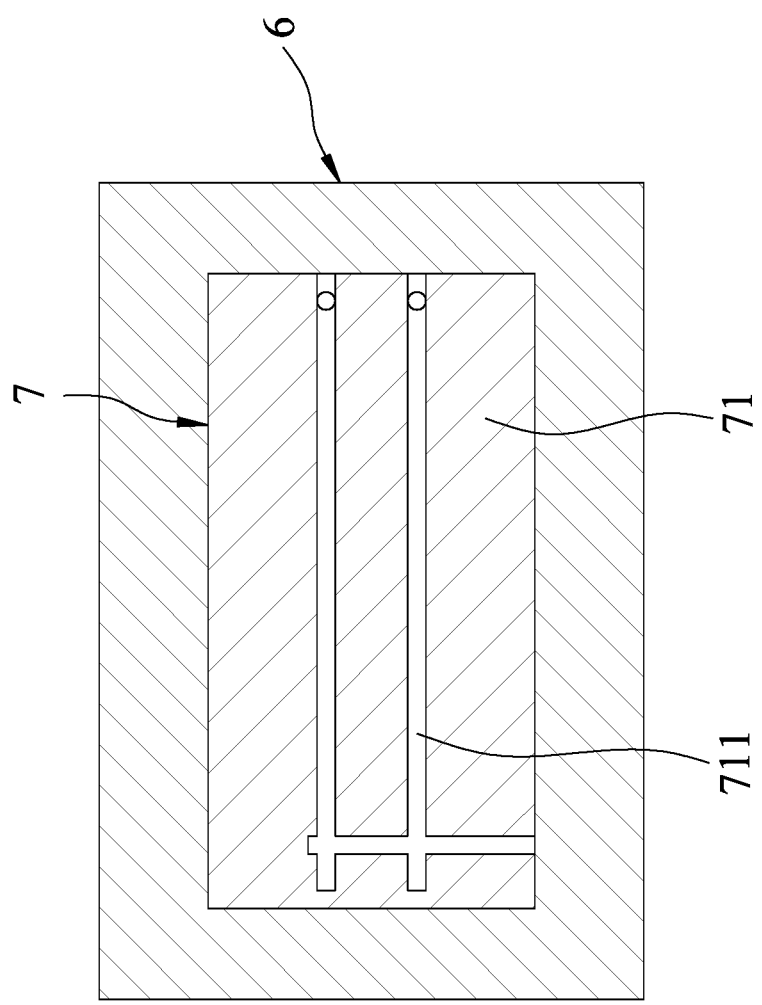
FIG. 5 is a sectional view of the embodiment taken along line V-V of FIG. 2.

Referring further to FIG. 4, the lower die core assembly 5 is mounted in the lower mounting portion 43 of the lower mold seat 4, and includes a lower die core unit 51 that defines a mold cavity 512, at least two positioning blocks 52 and a plurality of sealing members 53. In this embodiment, the lower die core assembly 5 includes four of the positioning blocks 52. The lower die core unit 51 is made of porous copper, and is made by one of powder metallurgy and 3D printing, and includes an internal loop adapted for a heated gas to flow therein, thereby allowing the heated gas to flow out of the lower die core unit 51. Detailed describe of the internal loop of the lower die core unit 51 will be provided hereinafter. The lower die core unit 51 further includes a mold plate 511 that is mounted in the lower mounting portion 43 of the lower mold seat 4, and at least two lower die cores 513 that surround the central axis (L), that are disposed on the mold plate 511, and that cooperate with the mold plate 511 to define the mold cavity 512. In this embodiment, the lower die core unit 51 four of the lower die cores 513. The mold plate 511 includes a mold plate passage 5111 that is adapted for the heated gas to flow therethrough. The positioning blocks 52 are fixedly disposed on the mold plate 511 of the lower die core unit 51. Each of the positioning blocks 52 includes a positioning block passage 521. Each of the lower die cores 513 includes a lower die core passage 5131, and is disposed between adjacent two of the positioning blocks 52. Each of the sealing members 53 includes a connecting passage 531 and is sealingly disposed between a corresponding one of the lower die cores 513 and a corresponding one of the positioning blocks 52.

The lower die core assembly 5 is convertible between a closed state (see FIGS. 2, 3 and 4), where the lower die core passage 5131 of each of the lower die cores 513 is fluidly communicated with the positioning block passages 521 of the adjacent two of the positioning blocks 52, and an open state (see FIGS. 6 and 7), where the lower die cores 513 are spaced apart from each other, and the lower die core passage 5131 of each of the lower die cores 513 is not fluidly communicated with the positioning block passages 521 of the adjacent two of the positioning blocks 52. When the lower die core assembly 5 is in the closed state, the connecting passage 531 of each of the sealing members 53 is fluidly communicated with the lower die core passage 5131 of the corresponding one of the lower die cores 513 and the positioning block passage 521 of the corresponding one of the positioning blocks 52.

The upper mold seat 6 is made of steel, and includes an upper mounting portion 63 that is upwardly concaved along the central axis (L), a downward facing surface 61 that faces the lower mold seat 4 and an upper insulating layer 62 that is formed on the downward facing surface 61.

The upper die core assembly is mounted in the upper mounting portion 63 of the upper mold seat 6, and includes an upper die core unit 71 that covers the mold cavity 512.

The upper die core unit 71 is made of porous copper, and includes an upper die core passage 711 that is adapted for the heated gas to flow therein, so as to allow the heated gas to flow out of the upper die core unit 71. In this embodiment, the upper die core unit 71 is made by one of powder metallurgy and 3D printing.

The lower heating unit 8 includes a lower high-frequency heating member 81 that is mounted to the lower mounting portion 43 of the lower mold seat 4, and that induces eddy current in at least one of the lower die core unit 51 and the lower mold seat 4 to heat up the at least one of the lower die core unit 51 and the lower mold seat 4. The lower heating unit 8 further includes a lower shielding layer 82 that is mounted in the lower mounting portion 43 of the lower mold seat 4, and that is located within the electromagnetic induction range of the lower high-frequency heating member 81 for preventing induction of eddy current in the lower mold seat 4 or to lower the eddy current induced in the lower mold seat 4. In this embodiment, the lower shielding layer 82 is disposed between the lower high-frequency heating member 81 and the lower mold seat 4. The lower heating unit 8 further includes a lower magnetic conducting layer 83 that is in direct contact with the lower die core unit 51 and that is located within the electromagnetic induction range of the lower high-frequency heating member 81.

The upper heating unit 9 includes an upper high-frequency heating member 91 that is mounted to the upper mounting portion 63 of the upper mold seat 6, and that induces eddy current in at least one of the upper die core unit 71 and the upper mold seat 6 to heat up the at least one of the upper die core unit 71 and the upper mold seat 6. The upper heating unit 9 further includes an upper shielding layer 92 that is mounted in the upper mounting portion 63 of the upper mold seat 6, and that is located within the electromagnetic induction range of the upper high-frequency heating member 91 for preventing induction of eddy current in the upper mold seat 6 or to lower the eddy current induced in the upper mold seat 6. In this embodiment, the upper shielding layer 92 is disposed between the upper high-frequency heating member 91 and the upper mold seat 6. The upper heating unit 9 further includes an upper magnetic conducting layer 93 that is in direct contact with the upper die core unit 71 and that is located within the electromagnetic induction range of the upper high-frequency heating member 91.

Referring to FIGS. 2 and 3, when the upper mold seat 6 and the upper die core assembly 7 are connected to the lower mold seat 4 and the lower die core assembly 5 and when the lower die core assembly 5 is in the closed state, the connecting passage 531 of each of the sealing members 53 is fluidly communicated with the lower die core passage 5131 of the corresponding one of the lower die cores 513 and the positioning block passage 521 of the corresponding one of the positioning blocks 52 for the heated gas to pass therethrough to heat up the foaming material 3, so that the foaming material 3 in the mold cavity 512 is molded.

If electricity is supplied to the lower high-frequency heating member 81 and the upper high-frequency heating member 91, eddy current will be induced in the lower magnetic conducting layer 83 and the upper magnetic conducting layer 93 and the lower magnetic conducting layer 83 and the upper magnetic conducting layer 93 will be heated up. Since the lower die core unit 51 and the upper die core unit 71 are respectively in direct contact with the upper magnetic conducting layer 93 and the lower magnetic conducting layer 83, the lower die core unit 51 and the upper die core unit 71 will also be heated up due to thermal conduction. The heated gas is introduced into the upper die core passage 711 of the upper die core unit 71, the mold plate passage 5111 of the mold plate 511, the lower die core passages 5131 of the lower die cores 513 and the positioning block passages 521 of the positioning blocks 52, and flows out of the upper die core unit 71, the mold plate 511 and the lower die cores 513 due to the porosity of the same. Therefore, the foaming material 3 in the mold cavity 512 can be uniformly heated.

It is worth mentioning that the exits of the lower die core passages 5131, the mold plate passage 5111 and the upper die core passage 711 may be provided with valves (not shown) for controlling the amount of heated gas entering the same.

Although the lower mold seat 4 and the upper mold seat 6 are magnetic conductive, the lower shielding layer 82 and the upper shielding layer 92 can prevent eddy current to be inducted in the lower mold seat 4 and the upper mold seat 6 or to lower the eddy current induced in the lower mold seat 4 and the upper mold seat 6.

Moreover, the lower insulating layer 42 and the upper insulating layer 62 can prevent electric arc from occurring between the lower mold seat 4 and the upper mold seat 6 when the upward facing surface 41 and the downward facing surface 61 are moved close to each other.

Figure 6:
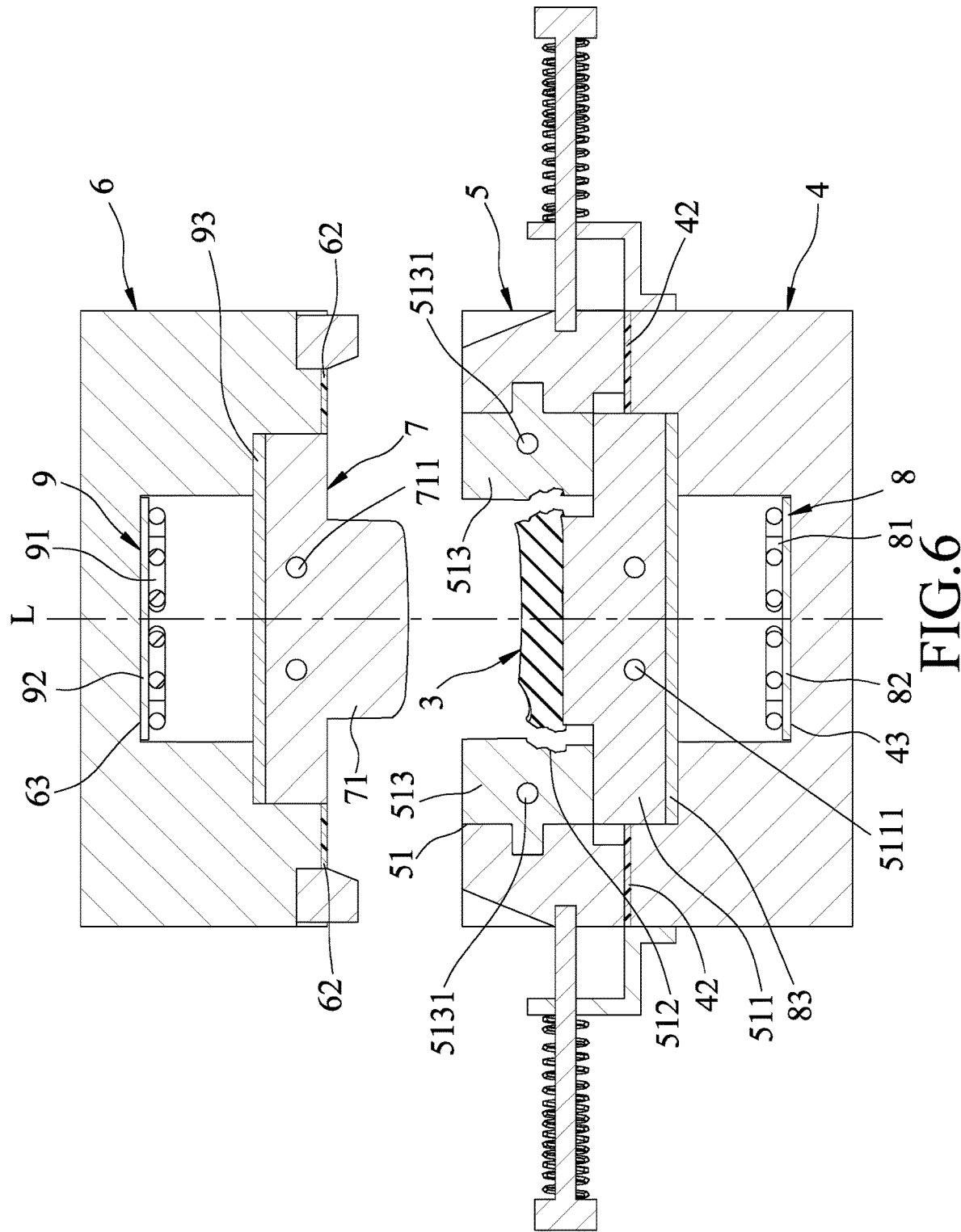
FIG. 6 is a partly exploded sectional view of the embodiment, showing the lower die core assembly in an open state and an upper mold seat of the embodiment spaced apart from the lower mold seat.
Figure 7:
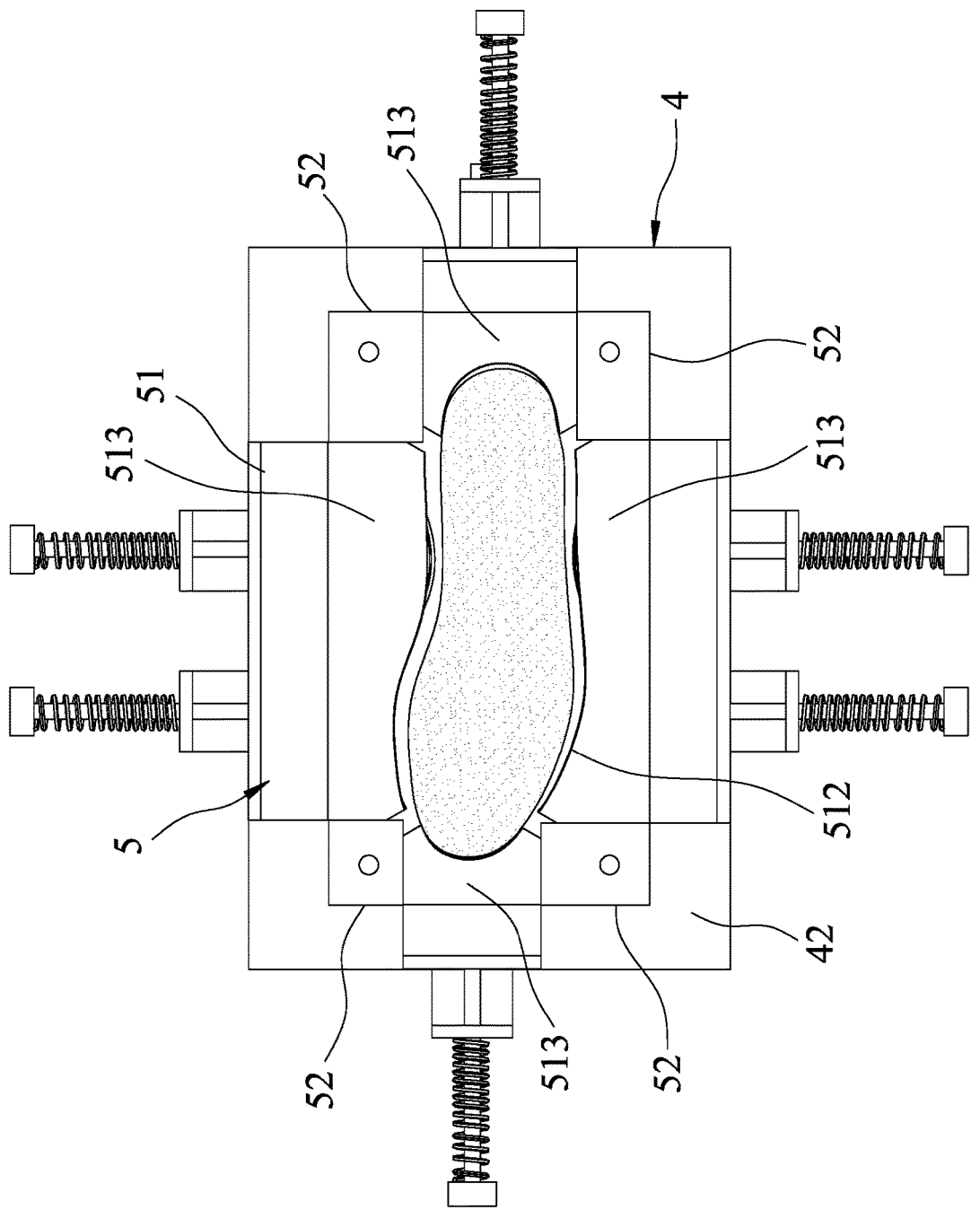
FIG. 7 is a top view of the lower mold seat and the lower die core assembly of the embodiment, showing the lower die core assembly in the open state.

Referring to FIGS. 6 and 7, when the upper mold seat 6 and the upper die core assembly 7 are away from the lower mold seat 4 and the lower die core assembly 5, and the lower die core assembly 5 is converted into the open state, the lower die cores 513 are spaced apart from each other, and the lower die core passage 5131 of each of the lower die cores 513 is not fluidly communicated with the positioning block passages 521 of the adjacent two of the positioning blocks 52, thereby allowing the molded foaming material 3 (i.e., shoe sole) to be removed from the mold cavity 512 by an automated removing device (not shown).

Figure 8:
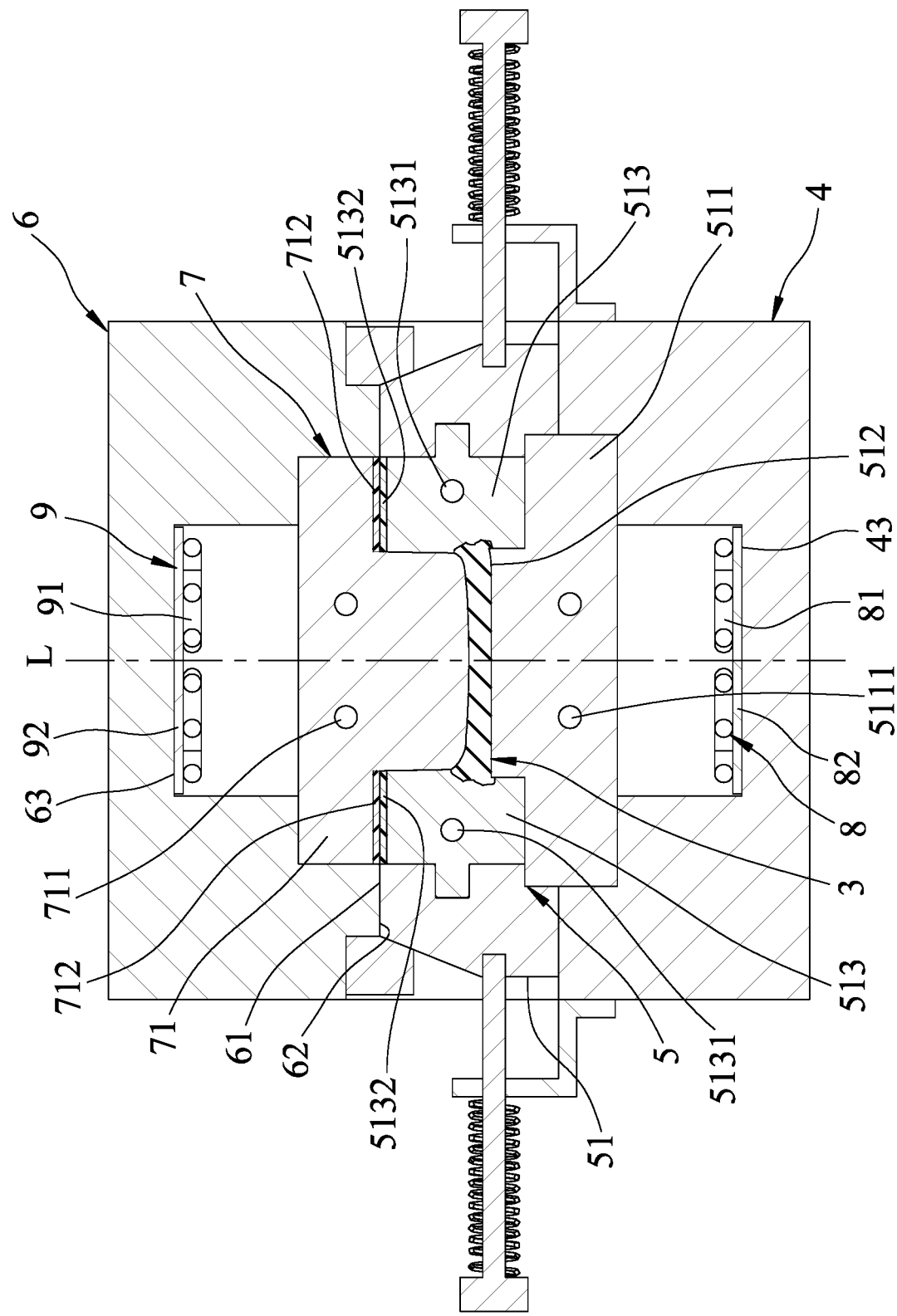
FIG. 8 is a sectional view of a variation of the embodiment.

FIG. 8 shows a variation of the embodiment of the molding device according to the present disclosure. In the variation, the lower magnetic conducting layer 83 and the upper magnetic conducting layer 93 of the embodiment are omitted. The lower die core unit 51 is made of a porous steel material, and is made by one of powder metallurgy and 3D printing. Each of the lower die cores 513 of the lower die core unit 51 includes a lower insulating layer 5132 having a top surface that faces the upper die core unit 71. The upper die core unit 71 is made of a porous steel material, is made by one of powder metallurgy and 3D printing, and includes an upper insulating layer 712 having a bottom surface that faces the lower die core unit 51.

Since steel is magnetic conductive, the lower die core unit 51 and the upper die core unit 71 can be heated by the lower high-frequency heating member 81 and the upper high-frequency heating member 91.

The lower insulating layer 5132 and the upper insulating layer 712 prevent the lower die core unit 51 and the upper die core unit 71 from electric arc damage.

In summary, the lower heating unit 8 and the upper heating unit 9 provide uniform heating to the foaming material 3 in the mold cavity 512. Moreover, the porous lower die core unit 51, the porous upper die core unit 71 and the abovementioned passages allow heated gas to flow out, so as to uniformly heat the foaming material 3 in the mold cavity 512.

In the description above, for the purposes of explanation, numerous specific details have been set forth in order to provide a thorough understanding of the embodiment and variation. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiment and variation, it is understood that this disclosure is not limited to the disclosed embodiment and variation but is intended to cover various arrangements included within the spirit and scope of the broadest interpretation so as to encompass all such modifications and equivalent arrangements.

What is claimed is:

1. A molding device adapted to heat and mold a raw material, said molding device comprising:
   a lower mold seat including a lower mounting portion;
   a lower die core assembly mounted to said lower mounting portion of said lower mold seat, and including a lower die core unit that defines a mold cavity;
   an upper mold seat including an upper mounting portion;
   an upper die core assembly mounted to said upper mounting portion of said upper mold seat, and including an upper die core unit that covers said mold cavity;
   a lower heating unit including a lower high-frequency heating member that is mounted to said lower mounting portion of said lower mold seat and that induces eddy current in at least one of said lower die core unit and said lower mold seat to heat up said at least one of said lower die core unit and said lower mold seat; and
   an upper heating unit including an upper high-frequency heating member that is mounted to said upper mounting portion of said upper mold seat and that induces eddy current in at least one of said upper die core unit and said upper mold seat to heat up said at least one of said upper die core unit and said upper mold seat,
   wherein said lower die core unit includes a mold plate that is mounted to said lower mounting portion of said lower mold seat, and at least two lower die cores, said lower die core assembly further including at least two positioning blocks that are disposed on said mold plate of said lower die core unit, each of said positioning blocks including a positioning block passage, each of said lower die cores including a lower die core passage and being disposed between said positioning blocks, said mold plate including a mold plate passage adapted for the heated gas to flow therethrough, said lower die core assembly being convertible between a closed state, where said lower die core passage of each of said lower die cores is fluidly communicated with said positioning block passages of said positioning blocks, and an open state, where said lower die cores are spaced apart from each other, and said lower die core passage of each of said lower die cores is not fluidly communicated with said positioning block passages of said positioning blocks.

2. The molding device as claimed in claim 1, wherein said lower mold seat is made of steel, said lower heating unit further including a lower shielding layer that is mounted to said lower mounting portion of said lower mold seat and that is located within the electromagnetic induction range of said lower high-frequency heating member, said upper mold seat being made of steel, said upper heating unit further including an upper shielding layer that is mounted to said upper mounting portion of said upper mold seat and that is located within the electromagnetic induction range of said upper high-frequency heating member.

3. The molding device as claimed in claim 2, wherein said lower shielding layer is disposed between said lower high-frequency heating member and said lower mold seat, said upper shielding layer being disposed between said upper high-frequency heating member and said upper mold seat.

4. The molding device as claimed in claim 2, wherein said lower mold seat further includes an upward facing surface that faces said upper mold seat and a lower insulating layer that is formed on said upward facing surface, said upper mold seat further including a downward facing surface that faces said lower mold seat and an upper insulating layer that is formed on said downward facing surface.

5. The molding device as claimed in claim 1, wherein each of said lower mold seat and said upper mold seat is made of steel, each of said lower die core unit and said upper die core unit being made of copper.

6. The molding device as claimed in claim 5, wherein said lower mold seat further includes an upward facing surface that faces said upper mold seat and a lower insulating layer that is formed on said upward facing surface, said upper mold seat further including a downward facing surface that faces said lower mold seat and an upper insulating layer that is formed on said downward facing surface.

7. The molding device as claimed in claim 5, wherein said lower heating unit further includes a lower magnetic conducting layer that is in direct contact with said lower die core unit and that is located within the electromagnetic induction range of said lower high-frequency heating member, said upper heating unit further including an upper magnetic conducting layer that is in direct contact with said upper die core unit and that is located within the electromagnetic induction range of said upper high-frequency heating member.

8. The molding device as claimed in claim 1, wherein each of said lower die core unit and said upper die core unit is made of steel, said lower die core unit including a lower insulating layer that faces said upper die core unit, said upper die core unit including an upper insulating layer that faces said lower die core unit.

9. The molding device as claimed in claim 1, wherein said lower die core unit includes an internal loop adapted for a heated gas to flow therein, and is made of a porous material so as to allow the heated gas to flow out of said lower die core unit.

10. The molding device as claimed in claim 1, wherein:
said lower die core assembly further includes a plurality of sealing members, each of said sealing members including a connecting passage and being sealingly disposed between a corresponding one of said lower die cores and a corresponding one of said positioning blocks; and
when said lower die core assembly is in the closed state, said connecting passage of each of said sealing members is fluidly communicated with said lower die core passage of the corresponding one of said lower die cores and said positioning block passage of the corresponding one of said positioning blocks.

11. The molding device as claimed in claim 1, wherein said upper die core unit includes an upper die core passage adapted for the heated gas to flow therein, and is made of a porous material so as to allow the heated gas to flow out of said upper die core unit.

* * * * *